United States Patent Office 3,411,373
Patented Nov. 19, 1968

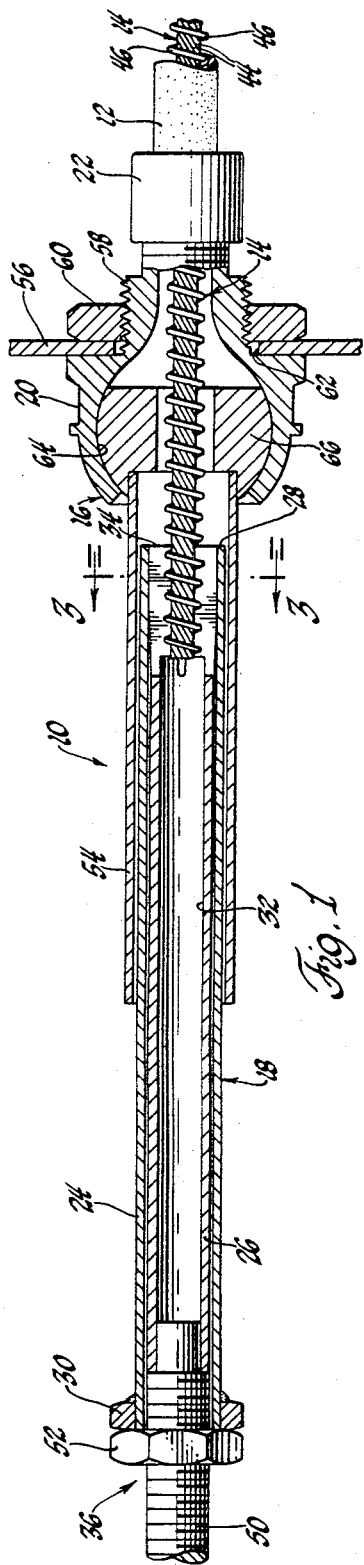

3,411,373
MOTION TRANSMITTING REMOTE
CONTROL ASSEMBLY
George M. Zieber, King of Prussia, and Rodney L. Alderfer, Harleysville, Pa., assignors to Teleflex Incorporated, North Wales, Pa., a corporation of Delaware
Filed Oct. 20, 1966, Ser. No. 588,166
11 Claims. (Cl. 74—501)

ABSTRACT OF THE DISCLOSURE

A motion transmitting remote control assembly which includes a conduit and a motion transmitting core element movably disposed in the conduit. A sleeve is operatively attached to the end of the conduit and slidably supports a tubular member. A gripping member is disposed within the tubular member and includes a first end which is flared and has a bore extending longitudinally thereinto for receiving the core element. The other end of the gripping member extends from the tubular member and has threads thereabout. A nut threadedly engages the threads on the gripping member and abuts the end of the tubular member to draw the gripping member into the tubular member so that the flared end of the gripping member is radially compressed and forced into gripping engagement with the core element as it moves into the tubular member. The nut may be loosened to move the flared end of the gripping member out of the tubular member to release the gripping connection with the core element so that the gripping member may be repositioned or adjusted along the length of the core element and redisposed in gripping connection with the core element, thus changing the overall length of the core element.

---

This invention relates to a motion transmitting remote control assembly which is normally operated to control a device by transmitting tension or compression in a curved path by means of a flexible core element.

Remote control assemblies of the instant type normally include a conduit with a motion transmitting core element slidably disposed in the conduit and fittings secured to the ends of the conduit. A rigid bar is swaged to each end of the core element and is slidably disposed in a fitting and extends from the fitting for attachment to a device to be controlled. When the rigid bars are swaged or otherwise fixedly secured to the ends of the core element, the length of the motion transmitting core element thereby becomes fixed. It is often desirable, however, to alter or change the length of the motion transmitting core element in such a motion transmitting remote control assembly.

Accordingly, it is an object and feature of this invention to provide a motion transmitting remote control assembly having rigid means connected to and selectively releasable from the core element for adjusting the position of the means along the core element thereby to adjust the length of the core element without deforming or damaging the core element.

Other objects and attendant advantages of the present invention will be readily appreciated as the same becomes better understood by reference to the following detailed description when considered in connection with the accompanying drawings wherein:

FIGURE 1 is a fragmentary cross-sectional view showing a preferred embodiment of the instant invention in the assembled position;

FIGURE 2 is a fragmentary cross-sectional view showing the preferred embodiment in a preassembled stage; and FIGURE 3 is a cross-sectional view taken substantially along line 3—3 of FIGURE 1;

Referring now to the drawings, wherein like numerals indicate like or corrresponding parts throughout the several views, a motion transmitting remote control assembly constructed in accordance with the instant invention is generally shown at 10. The remote control assembly 10 includes a conduit 12 and a motion transmitting core element which is movably disposed in the conduit 12 and generally indicated at 14. The assembly also includes first and second coacting telescoping means which are generally indicated at 16 and 18 respectively. The first means 16 is operatively connected to the conduit 12 through the swivel member 20 and nut 22 as will be more fully hereinafter described. The second means 18 is connected to and selectively releasable from the core element 14 for adjusting the position of the second means 18 along the core element 14.

The second means 18 includes coacting members 24 and 26 which are movable relative to one another for gripping and releasing the core element 14. More specifically, the coacting members include a tubular member 24, having first and second ends 28 and 30 respectively, and a gripping member 26. The gripping member 26 has a bore 32 extending longitudinally thereinto from a first end 34 for receiving the core element 14. The gripping member 26 is disposed in the tubular member 24 and includes means, generally indicated at 36, for moving the gripping member 26 into the tubular member 24. There is also included coacting means comprising the flared portion 38 of the gripping member 26 and the rounded corners 40 of the tubular member 24 for forcing the gripping member 26 into gripping connection with the core element 14 as the gripping member 26 is moved into the tubular member 24. The rounded edges 40 on the tubular member 24 extend between the inner diameter and the first end 28 thereof. The flared portion 38 is disposed adjacent the first end 34 of the gripping member 26 and is moved radially inward by contacting the rounded edges 40 as the gripping member 26 is moved into the tubular member 24. The gripping member 26 includes a plurality of slots 42 which extend therethrough and longitudinally therealong from the end 34. The core element 14 includes a plurality of wire strands 44 wound together on a long lead and a circular wire 46 wound helically about the strands 44 on a short lead to form spaced convolutions therealong. The gripping member 26 includes a helical groove in the small portion of the bore 32 adjacent the end 34 for receiving the circular wire 46 of the core element 14. Thus, when the gripping member 26 is forced into gripping connection with the core element 14, the core element 14 is not deformed or damaged.

The means 36 for moving the gripping member 26 into the tubular member 24 includes threads 50 along the second end or adjacent the second end of the gripping member 26 and a nut 52 which threadedly engages the threads 50 for abutting the second end 30 of the tubular member 24. As illustrated, the gripping member 26 is in two parts secured together; however, it will be understood that the gripping member 26 may take the form of one integral member and is, therefore, so regarded. As most clearly illustrated in FIGURE 2, the nut 52 may be rotated to draw or pull the gripping member 26 into the tubular member 24 so that the flared portions 38 engage the rounded corners 40 and force the flared portion of the gripping member 26 into gripping connection with the core element 14. In a similar manner, the nut 52 may be rotated in the opposite direction to allow the gripping member 26 to be moved out of the tubular member 24 and released from gripping connection with the core element to adjust the position or gripping connection of the gripping member 26 on the core element 14.

The first means 16 includes a sleeve 54 which slidably supports the tubular member 24. The first means 16 further includes the swivel member 20 which is adapted for connection to a support structure 56 and is operatively connected to the conduit 12 by the nut 22. The sleeve 54 is operatively connected to the swivel body 20 for swiveling movement relative thereto. More specifically, the swivel body 20 includes threads 58 for coacting with the nut 16 so that the threads 58 may be disposed through an aperture 62 and the nut 60 tightened against the support structure 56 to secure the swivel member 20 in position. The swivel member 20 has a cavity 64 therein and the sleeve 54 includes a spherical-shaped end 66 which is movably disposed and retained in the cavity 64 to allow the sleeve 54 to swivel relative to the socket member 20. The core element 14, therefore, extends from the end of the conduit 12, through the socket member 20, and into the sleeve 54 and is gripped by the gripping member 26.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

The embodiments of the invention in which an exclusive property or privilege is claimed are defined as follows:

1. A motion transmitting remote control assembly comprising; a conduit, a motion transmitting core element movably disposed in said conduit, and first and second coacting telescopic means, said first means operatively connected to said conduit, said second means having first and second ends, said first end being in telescoping relationship with said first means and connected to and selectively releasable from said core element for adjusting the position thereof along said core element, said second means extending from said first means to said second end thereof for attachment to a control member.

2. An assembly as set forth in claim 1 wherein said second means includes coacting members which are movable relative to one another for gripping and releasing said core element.

3. An assembly as set forth in claim 2 wherein said coacting members include a tubular member having first and second ends and a gripping member having a bore extending longitudinally thereinto from a first end thereof for receiving said core element, said gripping member disposed in said tubular member, means for moving said gripping member into said tubular member, and coacting means for forcing said gripping member into gripping connection with said core element as said gripping member is moved into said tubular member.

4. An assembly as set forth in claim 3 wherein said coacting means includes a flared portion adjacent said first end of said gripping member and which is moved radially inward by contacting said first end of said tubular member as said gripping member is moved into said tubular member.

5. An assembly as set forth in claim 4 wherein said first means includes a sleeve and said tubular member is slidably disposed in said sleeve.

6. An assembly as set forth in claim 5 wherein said gripping member includes at least one slot therethrough and extending longitudinally from said first end thereof.

7. An assembly as set forth in claim 6 wherein said core element includes a circular wire wound helically on a short lead to form spaced convolutions therealong, and said gripping member includes a helical groove in said bore adjacent said first end thereof for receiving said circular wire of said core element.

8. An assembly as set forth in claim 7 wherein said means for moving said gripping member into said tubular member includes threads along the second end of said gripping member and a nut on said threads for abutting said second end of said tubular member.

9. An assembly as set forth in claim 8 wherein said first means further includes a swivel member adapted for connection to a support structure and operatively connected to said conduit, said sleeve being operatively connected to said swivel member for swiveling movement relative thereto.

10. An assembly as set forth in claim 9 wherein said coacting means also includes a rounded edge on said tubular member between the inner diameter and said first end thereof.

11. A motion transmitting remote control assembly comprising: a conduit, a motion transmitting core element movably disposed in said conduit, said core element including a plurality of strands wound together on a long lead and a circular wire wound helically on a short lead about said strands to provide spaced convolutions, a swivel member secured to one end of said conduit and adapted to be secured to a support structure, said swivel member having a cavity therein, a sleeve having first and second ends and extending from said swivel member with means on said first end thereof which is movably disposed and retained in said cavity to allow said sleeve to swivel relative to said swivel member, a tubular member having first and second ends and slidably disposed in said sleeve with said second end thereof extending from the second end of said sleeve, a gripping member disposed within said tubular member and having a bore extending longitudinally thereinto from a first end thereof, the second end of said gripping member extending from said tubular member and having threads thereabout, said gripping member having at least one longitudinal slot therethrough and extending from said first end thereof, said gripping member having a helical groove in said bore adjacent said first end thereof for receiving said circular wire of said core element, said gripping member having a flared portion at said first end thereof, said tubular member having a rounded edge between the inner diameter and said first end thereof, said core element extending through said swivel member and into said sleeve, and a nut disposed on said threads on said gripping member for abutting said second end of said tubular member so that said core element may be disposed in said bore in said gripping member with said circular wire thereof disposed in said groove and said nut rotated to force said flared portion of said gripping member into said first end of said tubular member for gripping said core element therein, and whereby said nut may be rotated in the opposite direction for releasing said core element to move said core element into or out of said bore before regripping the core element thereby to adjust the relative longitudinal position of said core element with respect to said gripping member.

References Cited

UNITED STATES PATENTS

| | | | |
|---|---|---|---|
| 618,639 | 1/1899 | Bullard | 287—114 |
| 1,535,117 | 4/1925 | Fulton et al. | 287—75 X |
| 1,870,833 | 8/1932 | Burr | 287—75 X |
| 2,112,722 | 3/1938 | Weber | 74—502 |
| 2,438,380 | 3/1948 | Arens | 74—501 |
| 2,730,134 | 1/1956 | Morse | 74—501 |
| 2,817,247 | 12/1957 | Weinfurt et al. | 74—502 |

FRED C. MATTERN, Jr., *Primary Examiner.*

C. F. GREEN, *Assistant Examiner.*